United States Patent [19]

Bettner et al.

[11] 4,416,175

[45] Nov. 22, 1983

[54] COMPOSITE LAMINATING METHOD AND PRODUCT

[75] Inventors: Timothy J. Bettner, Costa Mesa; Frank E. Sullivan, Redondo Beach; Croydon R. Hartley, Fountain Valley, all of Calif.

[73] Assignee: Northrop Corporation, Hawthorne, Calif.

[21] Appl. No.: 344,479

[22] Filed: Feb. 1, 1982

[51] Int. Cl.³ .................. B26D 7/06; B32B 31/00; B32B 5/12

[52] U.S. Cl. .................................. 83/29; 83/917; 156/250; 428/105

[58] Field of Search .............. 156/182, 267, 88, 211, 156/250, 268, 299; 428/105; 83/29, 917

[56] References Cited

U.S. PATENT DOCUMENTS 3,959,544  5/1977  Rogers ........................... 428/109
4,236,386 12/1980  Yates ............................. 428/36
4,259,382  3/1983  Schwan ........................... 428/36

Primary Examiner—George F. Lesmes
Assistant Examiner—Beverly K. Johnson
Attorney, Agent, or Firm—John E. Peele, Jr.; Robert J. Stern; James E. Crawford

[57] ABSTRACT

A method of providing a structural drop-off in a preplied two or more sheet resin impregnated laminate for forming a composite of several laminates having different structural drop-off positions, each of the sheets having unidirectional fibers oriented at a bias relative to the fibers of the other sheet, and the steps of the method including making a plurality of feather cuts along one edge of the sheets in the direction of the fibers of one sheet and across the direction of the fibers of the other sheet resulting in negligible structural effect on one sheet and foreshortening of the fibers in the other sheet thereby providing a structural drop-off internal to the edge of the preplied two sheet laminate.

2 Claims, 2 Drawing Figures

COMPOSITE LAMINATING METHOD AND PRODUCT

BACKGROUND OF THE INVENTION

1. Field of the Invention

Advanced composites of layers of resin impregnated fibers are rapidly emerging as a primary material for use in near term and next generation aircraft structures as they provide greater structural efficiency at lower weights than equivalent metallic structures. These materials are expected to revolutionize the entire airframe industry within the next few years. The impact on the design and manufacture of near term and next generation high performance aircraft has been and will be significant. Based on the trends to date, the structures of the next generation aircraft could contain over 65 percent advanced composites. To meet these commitments, airframe manufacturers will be obligated to invent novel methods to reduce cost of assembling these composite structures.

Composite structures assembled by existing technology are formed by the lay-up of individual sheets to form a multi-ply or laminate structure prior to curing into a unified laminate component. The respective single-ply sheets of elongated fibers impregnated with partially cured resin have the fibers oriented in a given direction. The fibers may be boron, glass, kevlar or graphite. These elongated fibers are oriented in a first direction and impregnated with an epoxy, plastic or polyamide resin, to form matrices. The individual sheets are layed-up, one on the next, with the fibers oriented at different orientations one to the other. Further, the sheets are arranged along one reference line with the edge of the second sheet displaced from the reference line by a short distance, and following sheets displaced from the edge of the preceding sheet by similar amounts. This relative displacement of the edges provides for structural drop-off of loads relative to the several sheets. Thus, assembly of a composite structure requires that each sheet be layed-up individually with the fibers at different orientations. This lay-up procedure is therefore seen to require significant man-hours to complete the lay-up of a multi-ply composite structures.

A structural drop-off of a sheet occurs where the elongated unidirectional fibers of that sheet cease to carry a load, whereby the forces or loads are transferred into the fibers of adjacent sheets through the binder or matrix bonding the sheets into a composite assembly. When structural drop-offs all end along a common line, high stress concentrations occur which sometimes cause separations between the plies. This separation occurs as the sheer forces, imparted between individual sheets of the composite, cause a failure of the binder or matrix; effectively, delamination of the sheets. Therefore, multi-ply composite laminates require plies of unidirectionally oriented fibers pre-impregnated with resin to be oriented and positioned individually so that applied loads "drop-off" gradually from one ply to another, thereby minimizing interlaminar load transfer.

The time consumed in positioning each ply individually by the composite lay-up technician is the major problem in the manufacture of a structural part using unidirectional composite material preimpregnated with resin in drop-off areas.

The present invention overcomes the problem by replacing two separate plies of unidirectional material with one, feather cut, preplied sheet of cross-plied material in which the fibers are oriented on a bias one to the other, thereby imparting dimensional stability to the lay-up, providing a structural drop-off, and reducing lay-up time.

STATEMENT OF THE PRIOR ART

The following patents are cited as the most pertinent of which the applicants are aware:

| U.S. PAT. NO. | NAME | DATE |
| --- | --- | --- |
| 3,959,544 | C. W. Rogers | 25 May 1976 |
| 4,236,386 | D. N. Yates | 2 December 1980 |
| 4,259,382 | F. J. Schwan | 31 March 1981 |

U.S. Pat. No. 3,959,544, C. W. Rogers, is relevant only in that it teaches the use of unidirectional fiber material obliquely oriented at approximately a ±45° angle to fom a composite structure. The invention does not use preplied material nor is the concept of structural drop-off included in the patent.

U.S. Pat. No. 4,236,386, D. N. Yates, is relevant only in that it teaches the use of fibers laid-up in various oblique orientations.

U.S. Pat. No. 4,259,382, F. J. Schwan, is relevant for its showing of a structure which includes structural drop-offs.

None of the cited patents suggest either the use of preplied composite material in assembling a composite lay-up or a method for providing a structural drop-off within selected plies of a preplied composite.

BRIEF SUMMARY OF THE INVENTION

This invention affords an efficient and cost saving method for producing multisheet composite laminates having internal structural drop-offs. The method includes feather cutting a two-ply resin impregnated preplied material in which each ply or sheet is made up of unidirectional fibers with the fibers in each ply being oriented on a bias one to the other, preferably perpendicular to each other. The feather cut is made along an edge of the two-ply material in the direction of the fibers on the first sheet and across the direction of the fibers on the second. The cut through the first sheet parallel with the fibers does not alter the structural integrity of that sheet. However, cutting through the fibers on the second sheet renders the cut off ends ineffective as load carrying members and results in a two sheet preplied lay-up with a pre-established, dimensionally stable, structural drop-off.

An object of the present invention is to improve the dimensional stability of the drop-off areas in a lay-up of a composite structure.

Another object of the present invention is to provide a method of feather cutting preplied resin impregnated composite material to provide a structural drop-off.

Although the characteristic features of the present invention are particulaly pointed out and described with particular reference to the fabrication of a panel assembly, it is understood that the invention in its broader aspects is not limited to the manufacture of panels or any specific type of end product.

The method used in practicing the invention will be better understood by referring to the following description taken in conjunction with the accompanying drawings.

DETAILED DESCRIPTION OF THE INVENTION

Figure 1:
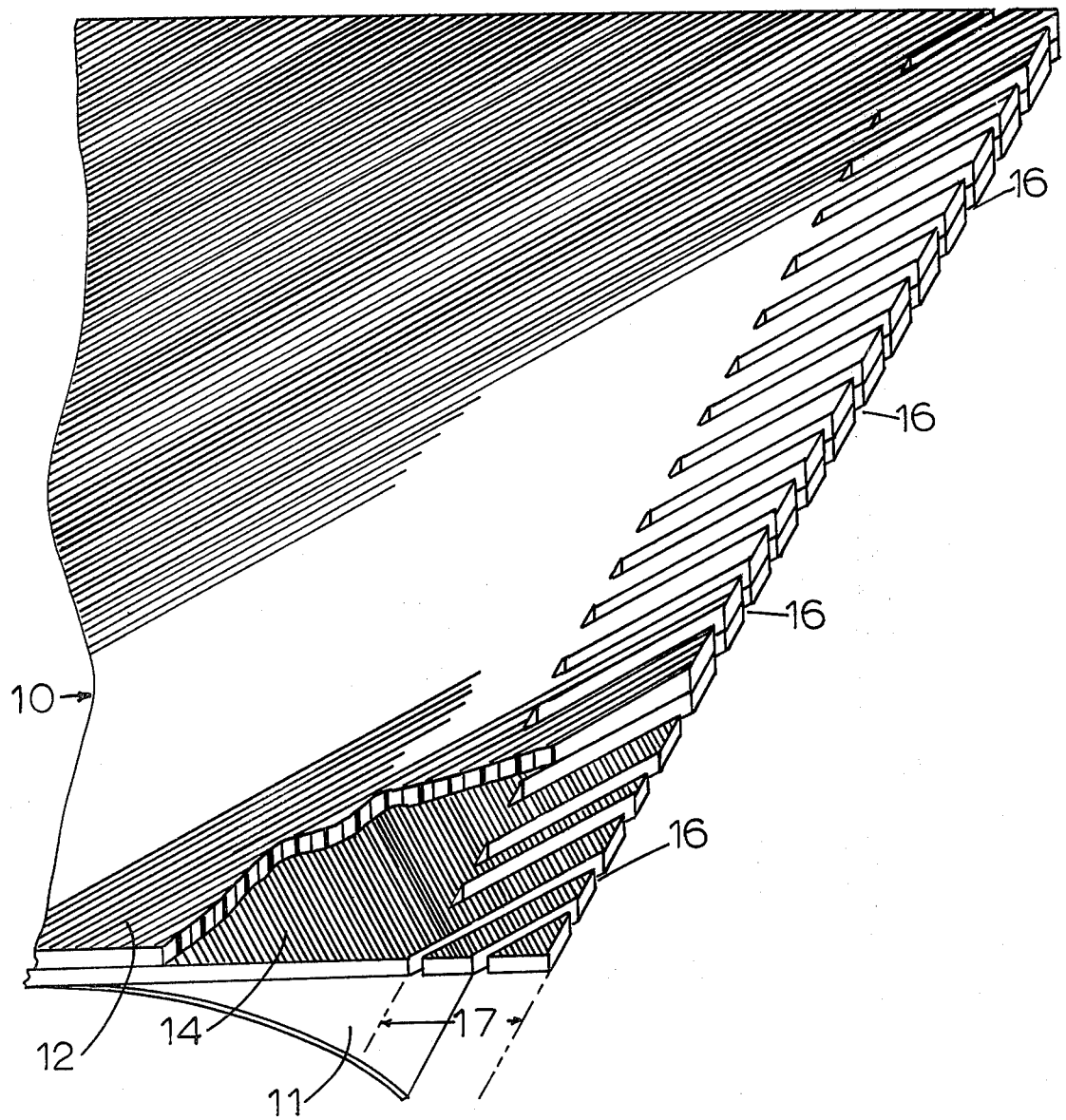
FIG. 1 is a fragmentary perspective view, partly in section, showing details of the present invention.

As shown in FIG. 1, a two sheet resin impregnated composite of preplied laminates is shown as a lay-up 10 resting on a backup (or carrier) sheet 11. The preplied composite lay-up 10 is made up of a first sheet 12 of partially cured resin filled with unidirectionally oriented fibers or filaments oriented at an angle of $-45°$ relative to a longitudinal dimension or edge of the composite preplied lay-up 10; and a second sheet 14 of partially cured resin filled with the unidirectional fibers thereof oriented at an angle of $+45°$ relative to the longitudinal dimension or edge of the composite preplied lay-up 10. The resulting relative orientations of the fibers places the fiber in one ply substantially perpendicular to the fibers in the other ply. The relative orientations or bias of the fibers may be selected at other relative angles so long as the fibers of one ply cross the fibers of the other ply at a sufficient angle to cause one ply to structurally reinforce the other over significant portions of the lay-ups. The method used to provide a structural drop-off in this composite preplied lay-up 10 is to feather cut the longitudinal edge of the composite preplied lay-up 10 in line with the unidirectional fibers of the first sheet 12 and across the direction of the unidirectional fibers of the second sheet 14. The separations or notches formed by the feather cutting results in a plurality of slices 16 being formed along the edge of the composite. Negligible structural effect occurs on the first sheet 12 since the fibers are intact. However, at the same time, foreshortening of the fibers of the second sheet 14 provide a structural drop-off 17 which extends to a depth substantially equal to the depth of the slices 16.

Figure 2:
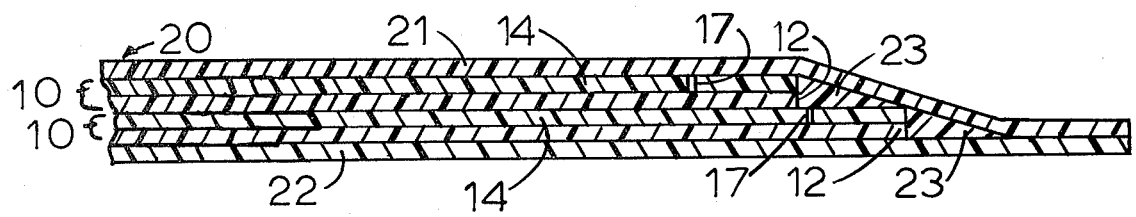
FIG. 2 is an elevational view in section, enlarged for clarity, showing the present invention incorporated in a panel lay-up.

After providing the composite preplied lay-up 10 with the structural drop-off 17, the back-up sheet 11 is removed and the preplied composite lay-up 10 is layed-up with other composite lay-ups and/or single ply sheets in a structural assembly 20, as shown by way of example in FIG. 2.

Referring now to FIG. 2. The structure 20 shown includes a top ply 21, and a bottom ply 22 between which two preplied laminate composites, previously feather cut as described above, are layed-up. Thereafter, structure is cured causing the partially cured resins of the sheets to flow and fill in areas, as at 23. Alternatively, additional resin or matrix material may be added to fill in the areas to insure integrity of the resulting end product. As can be visualized, in the cured structure 20, the loads carried by the fibers of each sheet 14 of each composite preplied assembly 10, having feather cuts across the fibers thereof, transfer through the matrix material at the feather cut established structural drop-off points 17 into the fibers of adjacent sheets. At the said time, the loads carried by the fiber of each first sheet 12, having the fibers thereof intact, transfer through the matrix into the fibers of adjacent sheets at the end of each sheet 12 thus providing a distribution of the structural loads into the adjacent plies and the panel, thereby minimizing the effects of interlaminar load transfer. The total load transfer therefore from the two preplied assemblies 10 is transferred at several drop-off points into the top and bottom sheets 21 and 22 respectively.

Although the foregoing invention has been described in some detail by way of illustration and example for purposes of clarity of understanding, it is understood that changes and modifications may be practiced within the spirit of the invention as limited only by the scope of the appended claims.

We claim:

1. A method of providing structural drop-off in a two-ply resin impregnated preplied laminate wherein each ply of said laminate has unidirectionally oriented fibers, with the fibers of each ply oriented across the fibers of the other ply on a bias, comprising the step of:

feather cutting a common edge of said two-ply resin impregnated preplied laminate so that said feather cuts are parallel to the orientation of the fibers in one said ply and across the orientation of the fibers in the other said ply whereby negligble structural effect is caused in said one ply and significant structural effect is caused in the other ply by shortening of the fibers along the feather cut edge.

2. The method of claim 1 wherein said plies of said laminate are oriented one to the other so that said unidirectional fibers are oriented at $\pm 45°$ relative to a common edge of said two-ply resin impregnated laminate.

* * * * *